UNITED STATES PATENT OFFICE.

FREDERIC B. NICHOLS AND CATHCART THOMSON, OF HALIFAX, NOVA SCOTIA, CANADA; SAID NICHOLS ASSIGNOR TO SAID THOMSON.

PROCESS OF MANUFACTURING FISH-MEAL.

SPECIFICATION forming part of Letters Patent No. 276,868, dated May 1, 1883.

Application filed December 5, 1881. (No specimens.)

*To all whom it may concern:*

Be it known that we, FREDERIC BOOTH NICHOLS and CATHCART THOMSON, both of the city and county of Halifax and Province of Nova Scotia, Canada, have jointly invented a new and useful Improvement in the Art or Process of Manufacturing Fish-Meal from Dried Fish; and we do hereby declare that the following is a full, clear, and exact description of the same.

The fish are headed and split and a portion of the backbone removed in the same manner as for making the ordinary dry salted fish. These should be washed with great care and all bloody portions removed. Very little salt should be used in curing them, as heavy salting makes a very inferior meal, even when the excess of it is removed by soaking in changes of water previous to drying. Only just enough should be used to properly season them for cooking, and for some qualities of meal we prefer to dry them without any salt. In this state they would quickly spoil, and very rapid drying must be resorted to in order to save them in good condition. The immediate application of currents of hot air would accomplish this, but would render the skin so friable as to defeat the after-process, and in other respects injure it for making meal, and open-air drying would not be speedy enough to keep them from tainting. In order to obviate these difficulties, we employ the fish-drying house and apparatus specified and claimed in United States Patent No. 260,382, issued to us December 6, 1881. The operation of this is so efficient that they can be safely dried with but little salt, and in cool dry weather even without any.

The drying must be more thorough than for ordinary dried fish, so as to make them hard and crisp. These hard-dried fish are either chopped or torn by suitable machinery, or by other means made small enough to be fed into the hopper of a mill to be ground. Almost any kind of grinding-mill may be used, provided it is not too sharp and is set high for coarse grinding for the first run. This should be bolted through bolts or sieves having about one hundred and forty-four meshes to the square inch. About seventy-five per cent. of it should pass through the bolt, and forms a first-class article of meal. The remainder, which is too coarse to pass through, consists of the bones and the skin with considerable fish-flesh adhering to it. In order to utilize this, it is reground with the mill set closer than in the first grinding, and again passed through the same bolt as previously used. If on examination much fish still adheres to the skin, it should be subjected to another grinding with a still closer set of the mill, and again passed through the same bolt. The residue from this, consisting principally of skin, bones, and scales, should not amount to more than ten per cent. of the weight of the dried fish. This residue can be utilized as manure of superior quality. The product of these last grindings contain considerable of the white portion of the skin with fragments of bone and enough of the black skin to give a coarse dirty appearance to the meal. In order to remedy this, it should be again ground in a sharper and closer-set mill to reduce it to a fine meal, and this, being passed through a bolt having about four hundred meshes to the square inch, gives a product pleasing to the eye and taste, and contains the most nourishing portion of the fish. This can be either used alone or incorporated with the first by uniform mixing.

By this process ninety (90) per cent. of the dried fish can be used as food of superior quality. The skin of fresh or slightly salted fish, when dried hard, becomes quite tough and parchment-like, and in great measure escapes the first grinding in a dull high-set mill; but a small quantity of the bones are ground fine enough to pass through the bolt from the first milling.

We are aware that fish-meal has been previously made; but in all previous processes, so far as we are aware, the fish used have been so salt as to require soaking the meal to remove the excess of salt before cooking, and the skin, fins, tail, and larger bones removed before grinding. We propose to use fish dried with little or no salt, and to grind them without removing either skin, bones, or other refuse contained in fins or tail, and to separate them by bolting.

What we claim as our invention, and desire to secure by Letters Patent, is—

The process of manufacturing fish-meal from dried fish, which consists in first heading and splitting the fish, then removing the backbone, then washing and drying, then chopping, grinding, and bolting through sieves, substantially as specified.

FREDERIC BOOTH NICHOLS.
CATHCART THOMSON.

Witnesses:
FREDERICK SUMMERS,
DAVID BOUTILIER.